United States Patent
Edwards et al.

(10) Patent No.: US 6,596,804 B1
(45) Date of Patent: Jul. 22, 2003

(54) EMULSION POLYMERS

(75) Inventors: Steven Scott Edwards, Horsham, PA (US); Ralph Craig Even, Blue Bell, PA (US); Loretta Ann Wieckowski, Hatfield, PA (US); Alexander Kowalski, Plymouth Meeting, PA (US)

(73) Assignee: Rohm and Haas Company, Philadelphia, PA (US)

( * ) Notice: Subject to any disclaimer, the term of this patent is extended or adjusted under 35 U.S.C. 154(b) by 269 days.

(21) Appl. No.: 09/707,034

(22) Filed: Nov. 6, 2000

Related U.S. Application Data

(60) Provisional application No. 60/164,487, filed on Nov. 9, 1999.

(51) Int. Cl.[7] ............................... C08F 2/22; C08F 2/24
(52) U.S. Cl. ......................... 524/458; 526/81; 526/89; 526/911; 526/915
(58) Field of Search ................... 524/700, 704, 524/714, 733, 734, 735, 764, 458; 526/911, 80, 81, 89, 915

(56) References Cited

U.S. PATENT DOCUMENTS

| | | | |
|---|---|---|---|
| 4,659,771 A | * 4/1987 | Craig | 524/700 |
| 4,684,704 A | 8/1987 | Craig | 526/200 |
| 4,801,643 A | 1/1989 | Craig | 524/832 |
| 4,845,175 A | 7/1989 | Lo | 526/200 |
| 4,868,238 A | 9/1989 | Craig | 524/457 |
| 5,665,816 A | * 9/1997 | Gerharz et al. | 524/733 |
| 5,705,553 A | 1/1998 | Kuropka | 524/459 |
| 5,795,928 A | * 8/1998 | Janssen et al. | 524/48 |
| 5,834,538 A | 11/1998 | deHullu et al. | 524/22 |

FOREIGN PATENT DOCUMENTS

| | | |
|---|---|---|
| RU | 737409 | 6/1980 |
| RU | 794593 | 1/1981 |

\* cited by examiner

*Primary Examiner*—Robert D. Harlan
(74) *Attorney, Agent, or Firm*—Ronald D. Bakule

(57) ABSTRACT

An emulsion polymer and a method for preparing the emulsion polymer by the free radical polymerization of at least one first ethylenically unsaturated monomer to form a first emulsion polymer and the subsequent treatment of the first emulsion polymer with a colloidal stabilizer, at least one second ethylenically unsaturated monomer, and a redox system at 20–85° C. is provided.

6 Claims, No Drawings

EMULSION POLYMERS

CROSS REFERENCE TO RELATED PATENT APPLICATIONS

This is a non-provisional application of prior pending U.S. provisional application Ser. No. 60/164,487 filed Nov. 9, 1999.

This invention relates to emulsion polymers and a method for preparing emulsion polymers. More particularly this invention relates to emulsion polymers capable of contributing useful rheological properties to aqueous coating compositions containing the emulsion polymers. The emulsion polymers are prepared by the post-polymerization treatment of a first emulsion polymer with colloidal stabilizer, monomer, and a redox system at 20–85° C.

U.S. Pat. No. 5,665,816 discloses aqueous dispersions prepared by the polymerization of vinyl acetate, ethylene, and various ethylenically unsaturated comonomers in the presence of unsaturated carboxylic acid and 1.5–20% by weight of cellulose ether, to form a copolymer having a glass transition temperature of −40° C. to 0° C. and comprising a cellulose ether in at least partly grafted form. The unsaturated carboxylic acid and cellulose ether are present throughout the polymerization reaction.

The problem faced by the inventors is the provision of modified emulsion polymers. The inventors found that treatment of a first emulsion polymer with colloidal stabilizer, monomer, and redox system at 20–85° C. after the formation of the first emulsion polymer was effective in modifying the emulsion polymer and offered freedom from concern over gelation of the reaction mixture during the polymerization reaction. Further, the post-polymerization process may be effected at a different time and place and at a lower temperature than the original polymerization reaction, for example, beneficially freeing up the reaction kettle for subsequent polymerization reactions.

In a first aspect of the present invention there is provided an emulsion polymer formed by the free radical polymerization of at least one first ethylenically unsaturated monomer until at least 95% of the first monomer by weight has been converted to a first emulsion polymer and subsequent treatment of the first emulsion polymer with 0.01–6%, by weight, based on the weight of the first emulsion polymer, of a colloidal stabilizer, 0.01–10%, by weight, based on the weight of the first emulsion polymer, of at least one second ethylenically unsaturated monomer, and 0.05–0.35%, by weight, based on the weight of the first emulsion polymer, of a redox system at 20–85° C. until at least 90% of the sum of the residual monomer of the first emulsion polymer and the second monomer has been converted to polymer.

In a second aspect of the present invention there is provided a method for preparing an emulsion polymer including forming a first emulsion polymer by the free radical polymerization of at least one first ethylenically unsaturated monomer until at least 95% of the first monomer by weight has been converted to the first emulsion polymer; and subsequently treating the first emulsion polymer with 0.01–6%, by weight, based on the weight of the first emulsion polymer, of a colloidal stabilizer, 0.01–10%, by weight, based on the weight of the first emulsion polymer, of at least one second ethylenically unsaturated monomer, and 0.05–0.35%, by weight, based on the weight of the first emulsion polymer, of a redox system at 20–85° C. until at least 90% of the sum of the residual monomer of the first emulsion polymer and the second monomer has been converted to polymer.

This invention relates to an emulsion polymer formed by the free radical polymerization of at least one first ethylenically unsaturated monomer until at least 95% of the first monomer by weight has been converted to a first emulsion polymer and subsequent treatment according to the method of this invention. The first emulsion polymer contains at least one copolymerized ethylenically unsaturated monomer. Ethylenically unsaturated monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyethyl (meth)acrylate and hydroxypropyl (meth)acrylate; (meth)acrylamide; (meth)acrylonitrile; styrene and substituted styrenes; butadiene; vinyl acetate, vinyl butyrate and other vinyl esters; and vinyl monomers such as ethylene, vinyl chloride, vinylidene chloride. The use of the term "(meth)" followed by another term such as acrylate or acrylamide, as used throughout the disclosure, refers to both acrylates or acrylamides and methacrylates and methacrylamides, respectively.

The first emulsion polymer may contain from 0 to 5%, preferably from 0.5 to 2%, by weight based on polymer weight, of a copolymerized monoethylenically-unsaturated acid-group containing monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, sulfoethyl methacrylate, and phosphoethyl methacrylate. The first emulsion polymer may contain from 0 to 5%, preferably from 0 to 2%, by weight based on polymer weight, of a copolymerized monoethylenically-unsaturated amino-group containing monomer, based on the weight of the polymer, such as, for example, diethylaminoethyl (meth)acrylate and t-butylaminoethyl (meth)acrylate. The first emulsion polymer may contain from 0% to 1%, by weight based on polymer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred first emulsion polymers contain predominant amounts of copolymerized acrylic, styrene+acrylic, or vinyl acetate+acrylic monomers. More preferred first emulsion polymers contain copolymerized ethyl acrylate or butyl acrylate. Most preferred first emulsion polymers contain predominant amounts of methyl methacrylate and ethyl acrylate or methyl methacrylate and butyl acrylate.

The glass transition temperature ("Tg") of the first emulsion polymer is preferably from −40° C. to 85° C., more preferably from −10° C. to 40° C., as measured by differential scanning calorimetry (DSC) taking the mid-point in the heat flow versus temperature transition as the Tg value, the monomers and amounts of the monomers being selected to achieve the desired polymer Tg range as is well known in the art.

The polymerization techniques used to prepare the first emulsion polymer are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is typically 0.1% to 6% by weight, based on the weight of monomer. The monomer may be added neat or as an emulsion in water. The monomer may be added in one or more additions or continuously, linearly or not, over the reaction period, or combinations thereof.

Either thermal or redox initiation processes may be used in the preparation of the first emulsion polymer. Conventional thermal free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. "Redox systems" herein are oxidant+reducing agent combinations effective to generate free radicals, including the same free radical initiators listed hereinabove as oxidant and a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may optionally be used. The initiator or initiator system may be added in one or more additions or continuously, linearly or not, over the reaction period, or combinations thereof.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, coordinated with the monomer addition or not, over most or all of the entire reaction period or during limited portion(s) of the reaction period.

The polymerization reaction temperature is typically maintained at a temperature lower than 100° C. throughout the course of the reaction to form the first emulsion polymer. Preferred is a reaction temperature between 30° C. and 95° C., more preferably between 40° C. and 90° C. The emulsion polymerization of first monomer to provide the first emulsion polymer is carried out such that the conversion of first monomer to first emulsion polymer is at least 95%, by weight, as may be determined, for example, by a gravimetric method or gas chromatography, before subsequent treatment of the first emulsion polymer is effected. The amount of first monomer not converted to first emulsion polymer is termed "the residual monomer of the first emulsion polymer" herein.

The average particle diameter of the first emulsion polymer particles is preferred to be from 10–5000 nanometers, more preferably from 50–1000 nanometers, as measured by a BI-90 Particle Sizer.

The first emulsion polymer is subsequently treated with 0.01–6%, preferably 0.1–5%, preferably 0.25–3%, by weight, based on the weight of the first emulsion polymer, of a colloidal stabilizer, 0.01–10%, preferably 1–10%, more preferably 2.4–6%, by weight, based on the weight of the first emulsion polymer, of at least one second ethylenically unsaturated monomer, and 0.05–0.35%, by weight, based on the weight of the first emulsion polymer, of a redox system at 20–85° C., preferably at 55–75° C., until at least 90% of the sum of the residual monomer of the first emulsion polymer and the second monomer has been converted to polymer, as may be determined, for example, by a gravimetric method or gas chromatography. Without being bound by any theory, it is believed that the effect of the treatment of the first emulsion polymer is to attach or graft some or all of the colloidal stabilizer to the surface of the first emulsion polymer particles, thereby beneficially modifying the emulsion polymer so formed and enhancing the viscosity and Theological properties of aqueous coating compositions containing the emulsion polymer. Formation of the emulsion polymer of this invention is taken herein as indicated by a higher viscosity measured at 12,000 $sec^{-1}$, such as ICI viscosity, of an aqueous coating composition containing the emulsion polymer, in contrast to a that of a blend of an untreated first emulsion polymer and the same amount of the same colloidal stabilizer.

By "colloidal stabilizer" herein is meant a nonionic molecule which is an effective agent for protecting charged colloidal particles in aqueous media against flocculation. Also known in the art as protective colloids, colloidal stabilizers have a weight average molecular weight between 1000 and 300,000 and are typically more hydrophilic than the composition of the first emulsion polymer, as measured by weight-averaged solubility parameters. Colloidal stabilizers known in the art include, for example, hydroxyethyl cellulose, preferably having a weight average molecular weight between 50,000 and 150,000; N-vinyl pyrrolidone; polyvinyl alcohol, preferably having a weight average molecular weight between 10,000 and 200,000; partially acetylated polyvinyl alcohol; carboxymethyl cellulose; gums such as gum arabic; starches; proteins; and mixtures thereof. Preferred as colloidal stabilizer is hydroxethyl cellulose or polyvinyl alcohol.

The second ethylenically unsaturated monomer(s) are monoethylenically unsaturated monomers such as those monoethylenically unsaturated monomers disclosed hereinabove as first ethylenically unsaturated monomers. Preferred second ethylenically unsaturated monomers are ethyl acrylate and butyl acrylate, mixtures thereof, and mixtures of monomers containing greater than 30 wt. % ethyl acrylate or butyl acrylate.

The redox systems used in the treatment of the first emulsion polymer include an oxidant and a reductant such as, for example, those disclosed hereinabove as suitable for the polymerization of the first emulsion polymer.

The treatment of the first emulsion polymer is carried out at 20–85° C. until at least 90% of the sum of the residual monomer of the first emulsion polymer and the second monomer has been converted to polymer. The colloidal stabilizer, the second ethylenically unsaturated monomer, and the redox system may be added in various combinations and in various manners. Preferred is the addition of the redox system as two separate solutions, one containing oxidant and a second containing reductant, in water and the addition of the colloidal stabilizer and emulsified second monomer as a second mixture in water. Either may be added as a single addition or as a gradual feed, concurrently or sequentially. Preferred is the addition of both concurrently over a period of time such as, for example from 5 to 20 minutes.

The treatment of the first emulsion polymer may be carried out in a batch, semi-continuous, or a continuous reactor or vessel including but not limited to the reactor or vessel in which the first emulsion polymer was formed. Preferred is the treatment of the first emulsion polymer in a second reactor, drain tank, storage tank, or the like so as to free the first polymerization reactor or vessel for further production. The site of the treatment of the first emulsion polymer according to this invention is less constrained than the selection of the reactor for the polymerization of the first emulsion polymer as the temperature required for the treatment including the redox system is generally lower that that found most desirable for the polymerization of the major part of the monomer and because the amount of heat generated during the treatment step is much lower that generated during the polymerization of the major part of the monomer.

The aqueous composition of this invention is prepared by techniques which are well known in the coatings art. First, if the coating composition is to be pigmented, at least one pigment is well dispersed in an aqueous medium under high shear such as is afforded by a COWLES® mixer or, in the alternative, at least one predispersed pigment may be used. Then the emulsion polymer is added under low shear stirring along with other coatings adjuvants as desired. Alternatively, the emulsion polymer may be included in the pigment dispersion step. The aqueous composition may contain conventional coatings adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from about 10% to about 70% by volume. The viscosity of the aqueous composition may be from 0.05 to 10 Pa.s (50 cps to 10,000 cps), as measured using a Brookfield viscometer; the viscosities appropriate for different application methods vary considerably.

The aqueous coating composition may applied by conventional application methods such as, for example, application with a brush or a paint roller, roll coating, doctor-blade application, printing methods, air-atomized spray, air-assisted spray, airless spray, high volume low pressure spray, and air-assisted airless spray.

The aqueous coating composition may be applied to a substrate for decorative, protective, adhesive, etc. effect on substrates such as, for example, plastic, wood, metal, previously painted surfaces, weathered surfaces, polymeric film, reconstituted wood products, cementitious substrates, asphaltic substrates or the like, with or without a prior substrate treatment such as an acid etch, corona discharge, or a primer.

The aqueous composition coated on the substrate is typically dried, or allowed to dry, at a temperature from 20° C. to 95° C.

The following examples are presented to illustrate the invention and the results obtained by the test procedures.
Abbreviations
AA=acrylic acid
BA=butyl acrylate
MMA=methyl methacrylate
AN=acrylonitrile
HEC=Hydroxyethyl cellulose
APS=Ammonium persulfate
t-BHP=t-Butyl hydroperoxide
SSF=sodium sulfoxylate formaldehyde

EXAMPLE 1

Preparation of emulsion polymer 1

To a three liter flask was charged 340 g deionized ("DI") water which was heated to 85° C. Then 11.0 g 45% solids 100 nm acrylic emulsion, rinsed with 5 g DI water, 3.6 g ammonium persulfate dissolved in 10 g DI water and 0.5 g (29%) aqueous ammonium hydroxide dissolved in 10 g DI water were added. A monomer emulsion consisting of 310 g deionized water, 2.4 g (23% active) sodium dodecylbenzenesulfonate, 416 g butyl acrylate, 523.8 g methyl methacrylate, and 12.3 g methacrylic acid was prepared. A 94% by weight portion of the monomer emulsion was then fed to the flask over a period of two hours. The reaction to prepare the first emulsion polymer was carried out at 85° C. The flask contents were then cooled gradually to 60° C. over a period of one hour("EOF Hold"). At 65° C., 15 g of a 0.1% iron sulfate heptahydrate solution was mixed with 1.5 g 1.0% Versene solution and added to the flask. This was followed by feeding of three separate mixtures beginning at the same time. The first mixture was 1.9% by weight, based on the weight of the first emulsion polymer, of hydroxyethyl cellulose (as a 7.4% solution of Cellosize® Hydroxyethyl Cellulose QP3L (Union Carbide)) mixed with 6.0% of the monomer emulsion (described above) which was fed over 17 minutes ("Stab Feed"). The second mixture was a solution of 1.4 g of ammonium persulfate dissolved in 25 g of deionized water. The third mixture was a solution of 0.3 g of sodium sulfoxylate formaldehyde dissolved in 25 g of deionized water which was fed over 20 minutes ("Oxid Red Feed"). The reaction mixture was held at 60° C. ("Treat Temp") for 20 minutes("End of Treat Hold") then 9.7 g (29%) aqueous ammonium hydroxide dissolved in 10 g of deionized water was added. A solution of 0.35 g (70%) t-butyl hydroperoxide dissolved in 5 g of deionized water and a solution of 0.17 g isoascorbic acid dissolved in 7.5 g of deionized water was added. Emulsion polymer 1 had a particle size of 550 nm, a total solids content of 49.3%, a Brookfield viscosity of 1710 mPs (1710 cps).

EXAMPLE 2

Preparation of emulsion polymers 2–17 and Comparative emulsion polymer A

Emulsion polymers 2–17 were prepared according to the method of Example 1 with the variations indicated in Table 4.1. Comparative emulsion polymer A was a first emulsion polymer to which 1.9% by weight, based on the weight of the first emulsion polymer, of HEC was added at room temperature.

EXAMPLE 3

Preparation of aqueous coating composition

A white paint was prepared by forming a dispersion containing 72 g propylene glycol, 13.6 g TAMOL 731 (25.0%)pigment dispersant, 1.48 g FOAMASTER VL(defoamer), and 267.64 g titanium dioxide (Ti-Pure R-900) using a COWLES disperser, followed by the addition of the emulsion polymer as identified in Table 4.1, TEXANOL coalescent, and NATROSOL 250 MR thickener solution and water to provide an aqueous coating with PVC (pigment volume concentration)=23.65 and VS(volume solids)=34.

EXAMPLE 4

Evaluation of performance of aqueous coating compositions containing the emulsion polymers The ICI (high shear) viscosity of aqueous coating compositions containing the emulsion polymers are presented in Table 4.1. The ICI viscosity was measured at a shear rate of 12,000 sec$^{-1}$ using an ICI cone and plate viscometer according to ASTM test method D 4287–94.

TABLE 4.1

Emulsion Polymers and Coatings Evaluations

| Emul Pol | PS nm | EOF Hold | % Sec Mon | Sec Mon | % Stab | Stab | Sec Mon + Stab Feed | ppm Oxid | Oxid | ppm Red | Red | Oxid + Red Feed | Treat Temp | End of Treat Hold | Emul Pol Solids | Emul Pol Visc | Aq Ctg ICI |
|---|---|---|---|---|---|---|---|---|---|---|---|---|---|---|---|---|---|
| 1 | 550 | 60 | 6.0 | ME | 1.90 | HEC | 17 | 1500 | APS | 300 | SSF | 20 | 60 | 15 | 49.3 | 1710 | 1.20 |
| 2 | 540 | 15 | 6.0 | ME | 1.90 | HEC | 13 | none | none | none | none | none | 78–85 | 15 | | | 0.95 |
| 3 | 476 | 15 | 10.0 | ME | 1.90 | HEC | 17 | none | none | none | none | none | 77–85 | 15 | 49.9 | 1480 | 0.95 |
| Comp A | 550 | 20 | none | none | none | HEC | none | none | none | none | none | none | none | none | | | |
| | | | | | 1.90 | HEC | | | | | | | RT | | | | 0.65 |
| 4 | 550 | 16 | 6.0 | ME | 1.90 | HEC | 17 | 500 | tBHP | 350 | IAA | shot | 70 | 10 | 50.1 | 760 | 0.80 |
| 5 | 550 | 27 | 6.0 | ME | 1.90 | HEC | 20 | 500 | tBHP | 350 | IAA | shot | 55 | 10 | 51.0 | 500 | 0.75 |
| 6 | 550 | 14 | 6.0 | ME | 1.90 | HEC | 17 | 700 | APS | 160 | SSF | 17 | 70 | 3 | | | 1.45 |
| 7 | 550 | 35 | 6.0 | ME | 1.90 | HEC | 15 | 700 | APS | 160 | SSF | 20 | 70 | 10 | 47.9 | 610 | 0.90 |
| 8 | 505 | 60 | 6.0 | ME | 1.30 | HEC | 15 | 1500 | APS | 300 | SSF | 15 | 64 | 15 | 49.3 | 1440 | 1.50 |
| 9 | 513 | 60 | 7.0 | ME | 1.00 | HEC | 15 | 1500 | APS | 300 | SSF | 15 | 64 | 15 | 49.6 | 590 | 1.30 |
| 10 | 508 | 60 | 6.0 | ME | 1.30 | HEC | 15 | 1500 | APS | 300 | SSF | 15 | 62 | 15 | 47.6 | 480 | 0.90 |
| 11 | 383 | 60 | 4.5 | ME | 0.75 | HEC | 10 | 1500 | APS | 300 | SSF | 10 | 65 | 15 | 49.5 | 280 | 0.70 |
| 12 | 385 | 60 | 6.0 | ME | 0.75 | HEC | 10 | 1500 | APS | 300 | SSF | 15 | 63 | 18 | 49.7 | 790 | 1.20 |
| 13 | 402 | 60 | 6.0 | ME | 0.75 | HEC | 10 | 1500 | APS | 300 | SSF | 10 | 63 | 11 | 49.4 | 440 | 1.60 |
| 14 | 380 | 60 | 6.0 | ME | 1.50 | HEC | 17 | 1500 | APS | 300 | SSF | 17 | 63 | 15 | 46.9 | 560 | 1.85 |
| 15 | 399 | 60 | 6.0 | ME | 1.50 | HEC | 20 | 1500 | APS | 300 | SSF | 20 | 63 | 15 | 47.3 | 1160 | 1.70 |
| 16 | 400 | 60 | 6.0 | ME | 1.50 | HEC | 15 | 1500 | APS | 300 | SSF | 15 | 64 | 15 | 49.2 | 880 | 0.90 |
| 17 | 400 | 60 | 6.0 | ME | 0.75 | HEC | 8 | 1500 | APS | 300 | SSF | 13 | 64 | 15 | 50.6 | 1180 | 0.90 |

Notes:
PS nm = particle size of polymer emulsion in nanometers
EOF Hold = Time in minutes between end of monomer feed in preparation of first emulsion polymer and beginning of treatment of first emulsion polymer
% Sec Mon, Sec Mon = Second monomer and weight % of monomer based on the weight of the first emulsion polymer added in the treatment of the first emulsion polymer;
ME = monomer emulsion, i.e., the same composition as the monomer composition of the first emulsion polymer was used
% Stab, Stab = colloidal stabilizer and wt. % colloidal stabilizer based on the weight of the first emulsion polymer added in the treatment of the first emulsion polymer
Sec Mon + Stab feed = Time in minutes over which the second monomer and colloidal stabilizer feeds were added in the treatment of the first emulsion polymer
ppm Oxid, Oxid, ppm Red, Red, Init + Red feed = the compositions and amounts of oxidant (Oxid) and reductant (Red) added in the treatment of the first emulsion polymer and the time in minutes over which they were added; shot = single addition
Treat Temp = Temperature during the treatment of the first emulsion polymer and hold period thereafter
Treat Hold = Time in minutes after the end of all feeds in the treatment of the first emulsion polymer before ammonia/water were added Coating compositions containing the emulsion polymers of Examples 1–7 of this invention exhibited a higher high shear (ICI) viscosity than that containing the emulsion polymer of Comparative Example A, all containing the same amount of colloidal stabilizer, indicative of the formation of an emulsion polymer of this invention and of improved rheological properties of the aqueous coating compositions containing them. Coating compositions containing the emulsion polymers of Examples 8–17 of this invention exhibited a higher high shear (ICI) viscosity than that containing the emulsion polymer of Comparative Example A, even though they contained lesser amounts of colloidal stabilizer, indicative of the formation of the emulsion polymer of this invention and of improved rheological properties of the aqueous coating compositions containing them.

What is claimed is:

1. An emulsion polymer formed by the free radical polymerization of at least one first ethylenically unsaturated monomer until at least 95% of said first monomer by weight has been converted to a first emulsion polymer and subsequent treatment of said first emulsion polymer with 0.01–6%, by weight, based on the weight of said first emulsion polymer, of a colloidal stabilizer, 1–10%, by weight, based on the weight of said first emulsion polymer, of at least one second ethylenically unsaturated monomer, and 0.05–0.35%, by weight, based on the weight of said first emulsion polymer, of a redox system at 20–85° C. until at least 90% of the sum the residual monomer of said first emulsion polymer and said second monomer has been converted to polymer.

2. The emulsion polymer of claim 1 wherein said colloidal stabilizer is selected from the group consisting of hydroxyethyl cellulose, N-vinyl pyrrolidone, polyvinyl alcohol, partially acetylated polyvinyl alcohol, carboxymethyl cellulose, gum arabic, and mixtures thereof, said colloidal stabilizer having a weight average molecular weight between 1000 and 300,000.

3. A method for preparing an emulsion polymer comprising forming a first emulsion polymer by the free radical polymerization of at least one first ethylenically unsaturated monomer until at least 95% of said first monomer by weight has been converted to said first emulsion polymer; and subsequently treating said first emulsion polymer with 0.01–6%, by weight, based on the weight of said first emulsion polymer, of a colloidal stabilizer, 1–10%, by weight, based on the weight of said first emulsion polymer, of at least one second ethylenically unsaturated monomer, and 0.05–0.35%, by weight, based on the weight of said first emulsion polymer, of a redox system at 20–85° C. until at least 90% of the sum of residual monomer of said first emulsion polymer and said second monomer has been converted to polymer.

4. The method of claim 3 wherein forming said first emulsion polymer and said treating of said first emulsion polymer are carried out in different reactors.

5. The method of claim 3 wherein said colloidal stabilizer is selected from the group consisting of hydroxyethyl cellulose, N-vinyl pyrrolidone, polyvinyl alcohol, partially acetylated polyvinyl alcohol, carboxymethyl cellulose, gum arabic, and mixtures thereof, said colloidal stabilizer having a weight average molecular weight between 1000 and 300,000.

6. An aqueous coating composition comprising the emulsion polymer of claim 1.

* * * * *